(12) United States Patent
Missotten et al.

(10) Patent No.: US 6,192,664 B1
(45) Date of Patent: Feb. 27, 2001

(54) HARVESTER WITH CROP FLOW RATE SENSOR

(75) Inventors: Bart M. A. Missotten, Leuven; Gilbert J. I. Strubbe, Loppem, both of (BE)

(73) Assignee: New Holland North America, Inc., New Holland, PA (US)

( * ) Notice: Subject to any disclaimer, the term of this patent is extended or adjusted under 35 U.S.C. 154(b) by 0 days.

(21) Appl. No.: 09/307,013

(22) Filed: May 7, 1999

(30) Foreign Application Priority Data

May 22, 1998 (GB) .................................................. 9811024

(51) Int. Cl.[7] .............................. G01F 1/30; A01D 61/04
(52) U.S. Cl. .................................. 56/10.2 R; 73/861.73; 460/1
(58) Field of Search .......................... 73/861.71, 861.72, 73/861.73, 861.74, 861.41; 460/1, 6, 7; 356/343; 56/10.2 R, 10.2 B, 10.2 C, 10.2 G, 10.2 J, DIG. 15; 701/50, 207, 213

(56) References Cited

U.S. PATENT DOCUMENTS

| | | | |
|---|---|---|---|
| 5,318,475 | * | 6/1994 | Schrock et al. .......................... 460/1 |
| 5,736,652 | * | 4/1998 | Strubbe ............................. 73/861.73 |
| 5,920,018 | * | 7/1999 | Wilkerson et al. ................ 73/861.41 |
| 5,959,218 | * | 9/1999 | Strubbe ............................. 73/861.73 |

* cited by examiner

Primary Examiner—Robert E. Pezzuto
(74) Attorney, Agent, or Firm—J. William Stader; Larry W. Miller

(57) ABSTRACT

An agricultural harvesting machine, such as a combine harvester comprising a header for collecting crop material from a field, an auger and straw elevator for conveying the collected crop into the harvesting machine and a threshing and cleaning system. The harvesting machine is equipped with a sensor for sensing the flow rate of at least a portion of the collected crop. The sensor is provided with dampening system for dampening mechanical vibrations caused by the header, the auger and the cleaning and threshing system. The sensor comprises an idler sprocket that senses the torque transmitted by a chain transmission upon a conveyor, such as the transverse conveyor of a header. The dampening system involves an inertia wheel attached to the driving sprocket of the chain transmission, an elastic coupling and further inertia wheel driven by the primary drive shaft of the header.

15 Claims, 3 Drawing Sheets

HARVESTER WITH CROP FLOW RATE SENSOR

BACKGROUND OF INVENTION

1. Field of Art

The present invention relates to harvesting machines for collecting crop material from the field, and more particularly to devices installed thereon for continuously measuring the rate of harvested crop material at a particular location in the machine.

2. Description of Prior Art

It is already well known in the art to equip agricultural harvesters with one or more devices for continuously measuring a flow rate of crop material therein. Such devices may comprise a grain flow sensor that measures the quantity of clean grain that is being delivered into a grain tank on the harvester. Their signal may be used for establishing the total yield for a field or a specific yield value for each portion of the field. The latter yield values may be combined with harvester position data from a global positioning system (GPS) sensor and harvester speed data for establishing a specific yield map for a complete field. The grain flow data provided by such devices, however useful they may be for information on the most useful portion of the crop, fail to give an indication on the total yield of the crop vegetation, which also includes straw or, in case of corn harvesting, corn stalks and leafs.

It is also known to monitor the load on one or more components of the harvester for automatically adjusting the settings thereof. Such settings may involve the travel speed of the harvester over the field or the speed of one of the crop processing apparatus inside the harvester, such as the threshing drum speed in case of a combine harvester. A prior art apparatus that has been used for predicting the total load on the crop processing apparatus measures the rate of incoming crop material at the header of a combine harvester. The header is equipped with a transverse auger that conveys cut crop material to the mouth of a straw elevator registering with the center of the header. The power required for rotating the auger is proportional to the mass flow rate of the incoming material and can be derived from the force on an idler sprocket in the chain transmission of the auger. A closed vessel, filled with hydraulic oil, and sealed with a rubber sheet was installed below the idler. The idler sprocket was mounted on a lever having an arm that engages the outer surface of the rubber sheet. The pressure of the arm on the sheet and hence the oil pressure in the vessel is directly related to the force on the sprocket and consequently to the torque used for rotating the auger. The pressure in the vessel is measured by an electric pressure transducer, which provides a good indication of the force on the idler sprocket. However this signal suffers from substantial noise caused by the other components of the header. Moreover the lever mounting of the idler was easily jammed by stray straw which accumulated onto and behind the lever.

SUMMARY OF THE INVENTION

Therefore it is an object of the present invention to provide a harvester equipped with means for measuring loads on components thereof for establishing the quantity of crop material passing at a particular location of the harvester, said means not suffering from excessive noise caused by surrounding components of the harvester.

According to the invention there is provided an agricultural harvesting machine, comprising:

means for collecting crop material from a field;
means for conveying the collected crop into the harvesting machine;
means for processing said collected crop; and
a sensor means for sensing the flow rate of at least a portion of said collected crop;
said sensor means further comprising a mechanical dampening means for dampening mechanical vibrations caused by said collecting means, said conveying means and/or said crop processing means.

Advantageously, the dampening means may be applied to a configuration comprising a sensor measuring the power taken up by a conveyor drive line. Such sensor generates a signal which is characteristic for the mass flow rate of the material transported by the conveyor. The dampening means may be constituted by a flywheel or inertia wheel, which may be driven via a flexible coupling by another inertia wheel.

The conveyor drive line may be a belt transmission comprising a pair of sheaves and a belt, or a chain transmission comprising a pair of sprocket wheels and a chain. The flow rate sensor may then sense the force induced on an idler wheel or sprocket by the belt or chain of the transmission. Such force is proportional to the torque transmitted by the transmission, which force in turn is proportional to the mass flow rate of the material transported by the conveyor.

For measuring the total flow of straw plus grain which is fed to the crop processing means of a harvester, the sensor may measure the torque of the transverse auger in the header.

The sensor arrangement may comprise a closed vessel filled with oil and having a wall portion upon which the force from the idler is transmitted. A pressure transducer can then be used for monitoring the power transmitted by the conveyor drive line. The number of movable components may be minimized by mounting the idler via resilient blocks onto the vessel and transmitting the force upon the idler via a plunger upon said wall portion. Such configuration is not rendered inoperable by the possible accumulation of stray crop material around the sensor arrangement.

An agricultural harvester equipped with a flow rate sensor means as described above and which further comprises means for establishing the position of said harvester in a field, means for sensing the speed of said harvester and means for logging the data generated by said position establishing means, said speed sensing means and said crop flow rate sensor means, can be used for establishing yield maps for a field.

The signal provided by the crop flow rate sensor means may also be used for adjusting the travel speed or the settings of the crop processing means, in order to keep the harvester operating at optimum efficiency.

BRIEF DECRIPTION OF THE DRAWINGS

An embodiment of the present invention will now be described in further detail, with reference to the following drawings in which.

DETAILED DESCRIPTION OF THE INVENTION

For convenience, the illustrated agricultural harvesting machine is a combine harvester equipped with a grain header of conventional design, but it readily will be appreciated that the invention is equally applicable to machines equipped with headers for harvesting other crops such as corn or sun-flowers. It may also be used in other harvesting machines such as forage harvesters. Its use on a combine harvester should thus not be appraised as limiting.

The terms "forward", "left", "right" and "rear" used in connection with the agricultural harvesting machine and/or components thereof are determined with reference to the direction of forward operative travel, but should equally not be considered as limiting. The terms "grain", "straw" and "tailings" are used principally throughout this specification for convenience, and it should be understood that these terms equally are not intended to be limiting. Thus "grain" refers to that part of the crop material which is threshed and separated from the discardable part of the crop material which is referred to as "straw". Incompletely threshed ears are referred to as "tailings".

Figure 1:
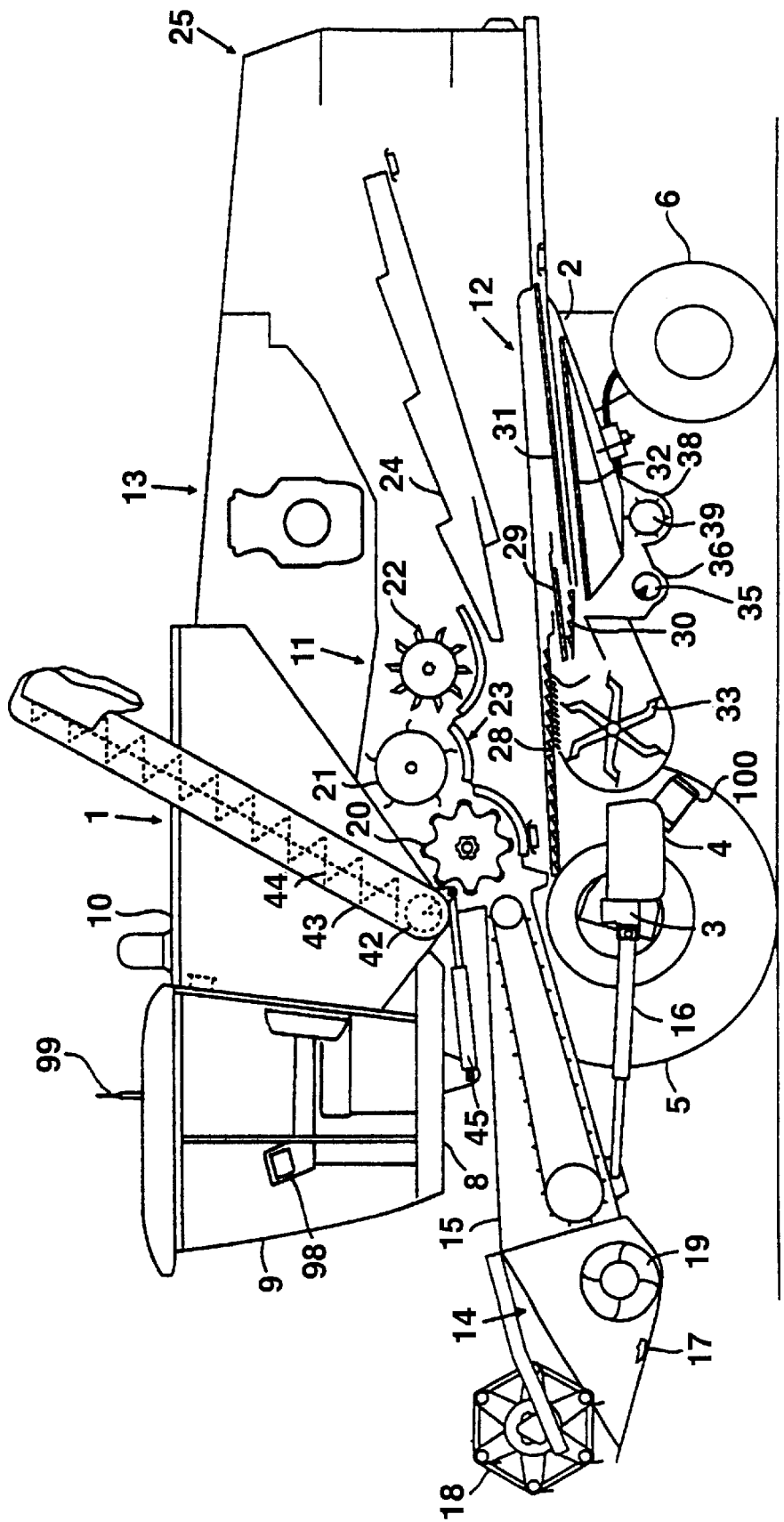
FIG. 1 is a schematic elevational view lengthwise of a combine harvester, equipped with a grain header having a transverse auger and cutting knife.

As illustrated in FIG. 1, a combine harvester, generally indicated at 1, comprises a main chassis or frame 2, supported on a fixed front axle 3 and an oscillating rear axle (not shown). The front axle 3 carries a traction gearbox 4, which is drivingly connected to a pair of drive wheels 5, supporting the front portion of the frame 2. A pair of steerable wheels 6 supports the rear axle. Mounted onto the main frame 2 are an operator's platform 8, with an operator's cab 9, a grain tank 10, a threshing and separating mechanism 11, a grain cleaning mechanism 12, and a power plant or engine 13. The threshing and separating mechanism 11 and the cleaning mechanism 12 together constitute crop processing means. A grain header 14 and straw elevator 15 extend forwardly of the main frame 2 and are pivotally secured thereto for generally vertical movement, which is controlled by hydraulic cylinders 16.

As the combine harvester 1 is propelled forwardly over a field with standing crop, the latter is severed from the stubble by a cutting arrangement in the form of sickle bar 17 at the front of the header 14. The crop is guided to the center of the header by a reel 18 and an auger 19 to the mouth of the straw elevator 15, which supplies the cut crop to the threshing and separating mechanism 11. The crop received therein is threshed and separated, that is to say, the crop is ribbed and beaten, whereby the grain, seed or the like, is loosened and separated from the straw, coils or other discardable part of the crop.

The combine harvester 1, illustrated in FIG. 1, comprises a conventional threshing and separation mechanism 11 including a threshing cylinder 20, a straw beater 21 and a separator rotor 22, cooperating with a set of concaves 23. Conventional straw walkers 24 are operable, in use, to discharge a mat of remaining crop material (i.e. mainly straw as most grain is separated therefrom) through a straw hood 25.

Grain which has been separated by the threshing and separating mechanism 11 falls onto a first grain pan 28 of the cleaning mechanism 12, which further also comprises a pre-cleaning sieve 29, positioned above a second grain pan 30, an upper chaffer sieve 31 and a lower grain sieve 32, disposed the one above the other behind and below the pre-cleaning sieve 29, and a cleaning fan 33.

Clean grain falls to a clean grain auger 35 in a clean grain auger trough 36 and is subsequently conveyed by the auger 35 and an elevator mechanism (not shown) to the grain tank 10. Incompletely threshed cars, the so-called "tailings", fall to a tailings auger in a tailings auger trough 38. The tailings are transported sideways by this auger to a separate rethresher 39 and returned to the first grain pan 28 for repeated cleaning action.

A grain tank auger 42 at the bottom of the grain tank 10 is used to urge the clean grain sideways to an unloading tube 43, wherein it is elevated by an unloading auger 44 for discharge from the harvester 1 into a container driven along the combine.

Figure 2:
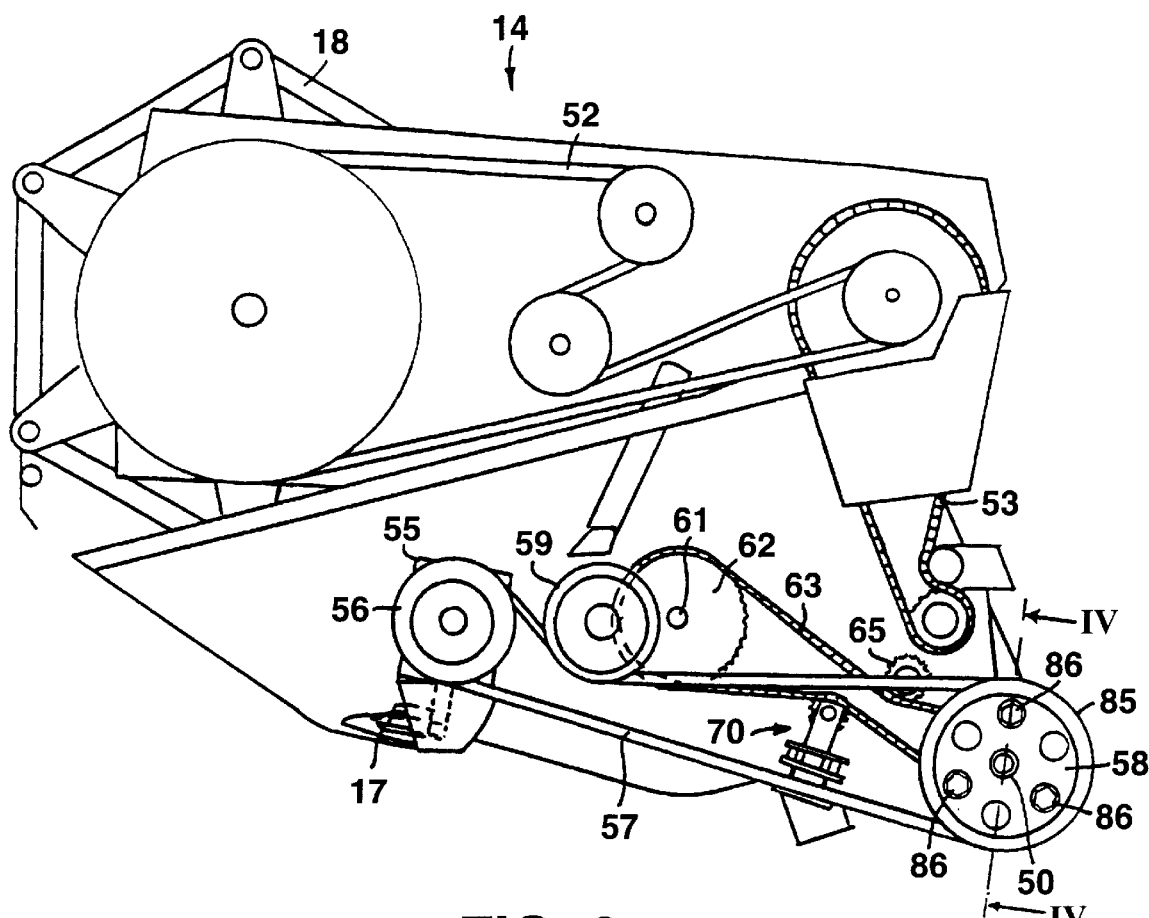
FIG. 2 is a schematic elevational view of the side of the header of FIG. 1, showing part of its drive line and a device for measuring the torque used for driving said auger.

As shown in FIG. 2, the components of the header 14 are driven by a primary drive shaft 50 which may be driven by the engine 13 via a drive line along the straw elevator 15 or by a hydraulic motor installed on the straw elevator 15 or on the header itself. The header drive line provides motive power for the rotation of the reel 18 and the auger 19 and for the motion of the sickle bar 17. The primary drive shaft 50 rotates the reel 18 via a drive line comprising a pair of variator sheaves interconnected by a belt (not shown), a chain 53 and a belt 52. The sickle bar 17 is oscillated by a gear box 55, which transforms the continuous rotation of its input shaft into the oscillatory movement of its output shaft. The input shaft carries a driven sheave 56 which is rotated by a belt 57, which in turn is driven by sheave 58 mounted onto the primary drive shaft 50. An idler 59 provides the necessary tension to the sickle bar belt 57. The header auger 19 has a shaft 61 that is provided with a sprocket wheel 62 for rotation thereof. An auger chain 63 is mounted over the sprocket wheel and a drive sprocket 64 (FIG. 4), which is driven in a manner as will be described below by the primary drive shaft 50. An idler sprocket 65 tensions the auger chain 63.

Figure 3:
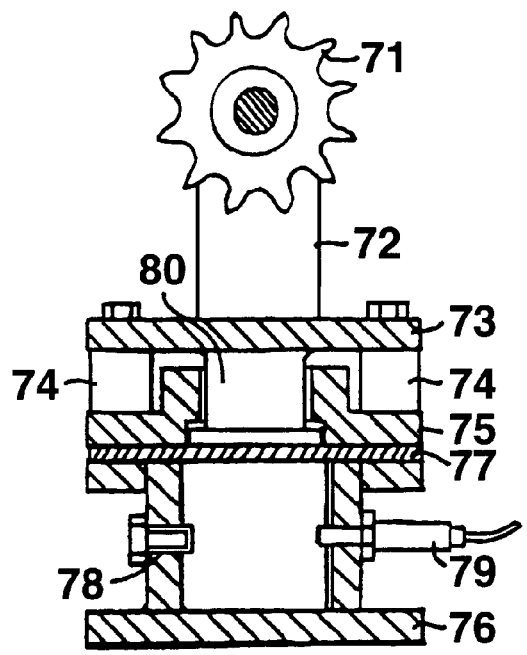
FIG. 3 is an enlarged, cross sectional view of the measuring device of FIG. 2.

The forces on the lower stretch of the chain 63 are sensed by a sensor arrangement 70. As shown in FIG. 3, it comprises a sensor sprocket 71, which engages the portion of the chain 63 that transmits the force from the drive sprocket 64 to the sprocket wheel 62. The sensor sprocket 71 is journaled between a pair of struts 72 welded to a square support plate 73. At its four corners, the support plate is bolted onto rubber mounts 74, which permit a slight vertical movement of the struts 72 and the sprocket 71. The mounts 74 are screwed into a top plate 75 covering a closed vessel 76. An oil-resistant rubber sheet 77 extends over the full top surface of the vessel and is held in place by the top plate 75. This plate has an aperture giving access to the rubber sheet 77. The vessel 76 has a fill hole 78 for filling the cavity of the vessel with oil and a transducer 79 for sensing the hydraulic pressure inside the vessel. The pressure transducer may be of the type PR 23 REL as provided by Greisinger. The rubber sheet 77 is contacted by a plunger 80 that extends downwardly from the support plate 72 through the aperture in the top plate 75.

When the header 14 gathers a larger quantity of crop material, the header auger 19 will require a larger amount of power. As the auger RPM does not vary significantly during normal harvesting operations, the auger torque is proportional to the consumed power and hence to the rate of the crop material conveyed by this auger. The torque increase tensions the driving portion of the chain 63 and effects a downward force on the sensor sprocket 71. The rubber mounts 74 enable a slight downward movement of the support plate 73 and the plunger 80. The action of the plunger base on the rubber sheet 77 raises the oil pressure in the vessel 76. Consequently the evolution of the oil pressure reflects the evolution of the torque on the header auger 19 and of the flow rate of harvested crop material. It has been experienced that the sensor arrangement 70 senses the mass flow rate of all crop material conveyed into the combine harvester 1: the transducer signal is proportional to the mass flow of straw plus the mass flow of grain.

The sensor sprocket 71 is located closer to the drive sprocket 64 than to the driven sprocket wheel 62. This eccentric location compensates for the rearward force component resulting from friction between the journals and the bearing of the sensor sprocket 71. Good results were obtained with a sprocket installed at 340 mm from the center of the sprocket wheel 62 and 300 mm from the center of the drive sprocket 64.

This sensor arrangement involves no significant movement of its components and is not prone to jamming by stray crop material that gets lodged between the sensor arrangement 70 itself and the side wall of the header 14. It requires no frequent interruption of the harvesting operations for cleaning of the sensor components.

Figure 4:
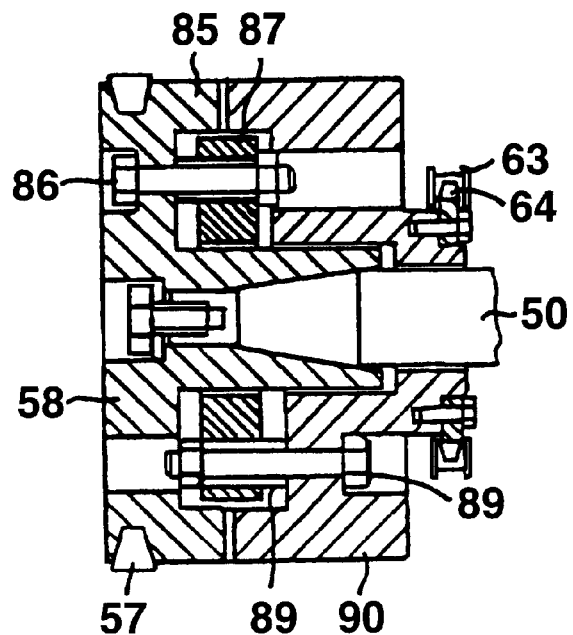
FIG. 4 is a cross sectional view of part of the header drive line taken along line IV—IV of FIG. 2.

As shown in FIG. 4, the sheave 58 of the sickle bar transmission is bolted onto the primary drive shaft 50. It has a thickened outer rim 85 that constitutes an inertia wheel for this drive line. Three bolts 86 are used to attach a coupling 87, made out of resilient material such as rubber and provided with metal bushings 88, to the sheave 58. Three more bolts 89 connect an inertia wheel 90 to the coupling 87. The inertia wheel is mounted concentric with the drive shaft 50 and carries the drive sprocket 64 of the auger drive line.

This coupling and inertia wheel arrangement substantially eliminates the transmittal of the vibrations from the drive line of the sickle bar 17 upon the auger torque sensor arrangement 70.

Figure 5:
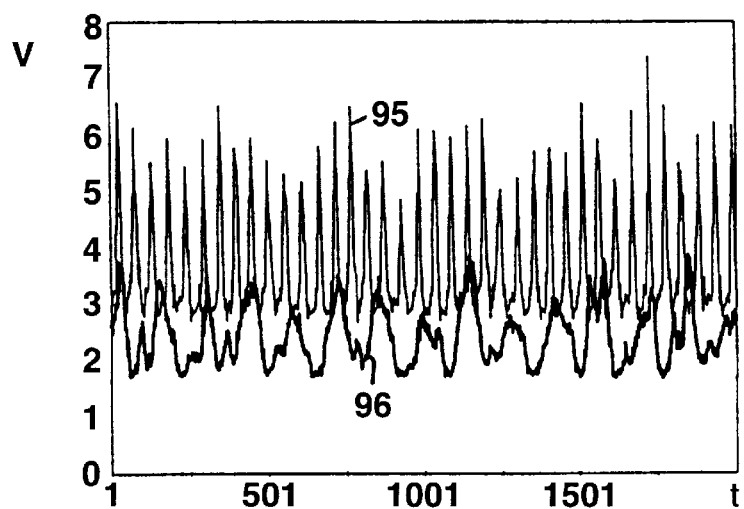
FIG. 5 is a graph representing the noise sensed by the measuring device of FIG. 2.

FIG. 5 shows a graph 95 of the signal of the pressure transducer 79 generated when the auger drive sprocket 64 is attached directly to a standard sheave of the sickle bar drive line, without the use of inertia wheels or an intermediate flexible coupling. The prominent high frequency noise follows from the to-and-fro movement of the sickle bar 17. The auger torque signal 95 was measured with an empty running header 14.

Graph 96 represents the signal of the same transducer 79 after installation of the inertia wheel 90, the flexible coupling 87 and the thickened sheave 58. The high frequency noise with its high amplitude has disappeared and there only remains a smaller disturbance from the rotation of the inertia wheel 90 itself, due to an imperfect alignment of the inertia wheel 90 and the drive sprocket 64 with respect to the drive shaft 50. This noise may be reduced by a better alignment of these components.

Simultaneously, surrounding components such as the header reel 18, the straw elevator 15 and the further crop processing means, has reduced the influence on the mass flow rate measurement by surrounding components such as the header reel 18, the straw elevator 15 and the further crop processing means also.

The combine harvester 1 is equipped with an on-board computer 98, which receives data from various sensors on the harvester 1. These sensors comprise the torque sensor arrangement 70, a position sensor 99 and a ground speed sensor 100 (FIG. 1). The position sensor 99 may be a receiver of a Global Positioning System (GPS) and the speed sensor 100 may be Doppler radar velocity sensor. During harvesting operations, the data generated by the sensors are logged for the creation of specific crop yield maps for each field.

The harvester 1 may also be equipped with actuators controllable through the computer 98. These actuators can be used to adapt the settings of various crop processing means to the measured crop yield rate. In this manner it is possible to adjust the ground speed of the combine harvester to the rate of the incoming crop material in order to keep the threshing and separating mechanism 11 working at maximum efficiency.

It will be appreciated that, although the present invention has been described with reference to a combine harvester and a grain header, it may also readily be used in combine harvesters equipped with corn headers or in other harvesting machinery such as forage harvesters.

It is also possible to install a torque sensor on the drive line of other conveying means of the harvester 1, e.g. of the elevator in the straw elevator 15 or one of the augers such as the unloading auger 44 or the clean grain elevator.

What is claimed is:

1. An agricultural harvesting machine comprising:
   means for collecting crop material from a field;
   means for conveying the collected crop into the harvesting machine;
   means for processing said collected crop;
   sensor means for sensing the flow rate of a portion of said collected crop; and
   said sensor means further comprising a mechanical dampening means for dampening mechanical vibrations caused by said collecting means, said conveying means and said crop processing means and
   further comprising a conveyor drive line for driving a portion of said conveying means; and said flow rate sensor means are operable to measure the power taken up by said conveyor drive line.

2. An agricultural harvesting machine according to claim 1, wherein said mechanical dampening means further comprises an inertia wheel coupled to said conveyor drive line.

3. An agricultural harvesting machine according to claim 2, said conveying means further comprises a rotative auger and said flow rate sensor means are operable to measure the torque used to rotate said auger.

4. An agricultural harvesting machine according to claim 3, further comprising:
   said conveyor drive line further comprises a driving sprocket, a driven sprocket, an endless chain and an idler tensioning said chain; and
   said flow rate sensor means are operable to measure the force induced by said chain onto said idler.

5. An agricultural harvesting machine according to claim 4, wherein said inertia wheel is coupled to said driving sprocket.

6. An agricultural harvesting machine according to claim 5, wherein said driving sprocket and the inertia wheel coupled thereto are driven by a coupling, made out of a resilient material.

7. An agricultural harvesting machine according to claim 6, wherein a flexible coupling is driven by a further inertia wheel.

8. An agricultural harvesting machine according to claim 7, wherein said flow rate sensor means further comprises:
   a closed vessel filled with a fluid and comprising a wall portion upon which at least a portion of the force induced on said idler is transmitted; and
   a pressure transducer operable to measure the pressure of said fluid in said vessel.

9. An agricultural harvester according to claim 8, wherein said idler is mounted onto said vessel by a resilient block and said idler is mounted slightly off center between said driving sprocket and said driven sprocket.

10. An agricultural harvesting machine according to claim 9, wherein said rotative auger is an intake auger of a header and said flow rate sensor means is operable to measure the mass flow rate of the crop material collected by said header.

11. An agricultural harvester according to claim 10, wherein said further inertia wheel is drivingly connected to a crop severing means of said header.

12. An agricultural harvester according to claim 11, further comprising:

means for establishing the position of said harvester in a field;

means for sensing the speed of said harvester; and means for logging the data generated by said position establishing means, said speed sensing means and said crop flow rate sensor means.

13. A method for establishing a specific yield map for a field using the data acquired by an agricultural harvesting machine according to claim 12.

14. A method for automatically adjusting the travel speed of an agricultural harvesting machine according to claim 12, using the data generated by said crop flow rate sensor means.

15. A method for automatically adjusting the settings of crop processing means of an agricultural harvesting machine according to claim 12, using the data generated by said crop flow rate sensor means.

* * * * *